United States Patent [19]
O'Connor

[11] Patent Number: 5,812,356
[45] Date of Patent: Sep. 22, 1998

[54] COMPUTER DOCKING SYSTEM HAVING AN ELECTROMAGNETIC LOCK

[75] Inventor: Clint H. O'Connor, Austin, Tex.

[73] Assignee: Dell U.S.A., L.P., Austin, Tex.

[21] Appl. No.: 696,459

[22] Filed: Aug. 14, 1996

[51] Int. Cl.$^6$ .................................................. H01H 35/14
[52] U.S. Cl. ........................... 361/179; 439/345; 335/179
[58] Field of Search ..................... 361/144, 179,
361/180, 732, 740, 747; 335/153, 157,
170, 171, 179, 192, 194, 195, 285, 289–291,
295; 307/119, 132 EA, 142; 439/305, 345,
350, 370, 919

[56] References Cited

U.S. PATENT DOCUMENTS

| | | | |
|---|---|---|---|
| 4,546,267 | 10/1985 | Urfirer ....................................... | 307/116 |
| 4,718,858 | 1/1988 | Godfrey et al. ......................... | 439/296 |
| 4,720,128 | 1/1988 | Logan, Jr. et al. ................. | 292/251.55 |
| 5,313,596 | 5/1994 | Swindler et al. ........................ | 361/725 |
| 5,396,400 | 3/1995 | Register et al. ......................... | 361/686 |
| 5,402,320 | 3/1995 | Penniman ................................ | 361/686 |
| 5,452,180 | 9/1995 | Register et al. ......................... | 361/686 |
| 5,526,493 | 6/1996 | Shu ......................................... | 395/281 |

*Primary Examiner*—Ronald W. Leja
*Attorney, Agent, or Firm*—Haynes and Boone, L.L.P.

[57] ABSTRACT

A method and apparatus for electromechanically locking a docking station to a computer using an electromagnetic attractive force is disclosed. In a preferred embodiment, the docking station includes a latching mechanism with a ferromagnetic handle, and an electromagnet proximately located to the latching mechanism. The latch mechanically secures the docking station to the PC. The electromagnet is positioned such that, when electrically energized, the electromagnetic field produced thereby attracts the handle with sufficient force to prevent the handle from being used to disconnect the PC from the docking station. Alternatively, the electromagnet can be located in the docking station so that it is near a ferromagnetic plate in the PC when the PC is docked. The electromagnet is positioned such that, when electrically energized, the electromagnetic field produced thereby attracts the plate with sufficient force so as to physically lock the plate to the electromagnet, thereby locking the PC to the docking station.

35 Claims, 5 Drawing Sheets

COMPUTER DOCKING SYSTEM HAVING AN ELECTROMAGNETIC LOCK

BACKGROUND OF THE INVENTION

The invention relates generally to a docking station for personal computers (PCs) and, more particularly, to a method and apparatus for electromechanically locking a docking station to a PC to secure an electrical connection therebetween.

Docking stations have become a common tool for linking PCs to peripheral devices such as monitors, keyboards, hard drives, and networks. Docking stations achieve this by providing connectors that mechanically and electrically engage with computer peripherals and a separate connector that engages with the PC to provide an electrical link between the PC and the peripherals. In this manner, the connection between the PC and the peripherals can be quickly made and easily configured.

One example of a docking station is the slice docking station or "slice". Slices have small box-shaped bodies and encase electrical connectors. When a portable PC is docked to a slice, the slice provides a connection between the PC and peripherals, such as external monitors and keyboards. Mounting and connecting the PC to one side of the slice body and connecting another side of the slice body to the computer peripherals docks the portable PC to the docking station. Once the PC is mounted, or docked, the slice provides electrical connections between the PC and the peripherals. When unmounted, or undocked, the PC is free from all the connections and can be easily removed.

There are at least three methods by which a PC can be docked to and undocked from a slice. For example, a "cold" dock or undock occurs when a PC is mounted to or unmounted from a slice while the PC and its peripheral connections are powered down. This is the safest method by which to change the peripheral connection between the PC and the peripherals via a docking station because any potential for electrical damage or injury to the PC, the peripherals, or both, is virtually eliminated.

A "warm" dock or undock occurs when the PC is mounted to or unmounted from the slice while the PC is powered up but the PC's peripheral connections are powered down. In warm dock and undock operations, the PC has had an opportunity to prepare for the change in configuration by saving data that could be lost, and by configuring the peripheral connections to an appropriate "off" state. This is also considered to be a safe way to alter the electrical connection between the PC and the peripherals, and prevent any electrical damage or injury to the PC, the peripherals, or both.

A "hot" dock or undock occurs when the PC is mounted to or unmounted from the slice while the PC and its peripheral connections are powered up. A "surprise" hot undock is a hot undock that occurs when the PC is utilizing the peripheral connections at the time the PC is being docked or undocked. A hot dock or undock does not always damage the PC or peripherals. A surprise hot undock, on the other hand, can cause many problems, such as damage to and loss of data on the PC, the peripherals, or both.

One problem associated with slices is that hot undocking and surprise hot undocking can occur for various reasons and at unexpected times. For example, a surprise hot undock can occur accidentally when the user bumps or moves the slice before the PC is prepared for any abrupt changes in its configuration. In addition, a surprise hot undock may occur when a user who is unaware of the potential for damage during a hot undock attempts to change the PC's configuration.

Another problem associated with slices is that they are unable to prevent or hinder unauthorized removal of the PC from the slice. Many computer environments require that the PC and the peripherals be secured to a desk or work area in order to prevent any theft or unauthorized removal of the computer equipment. Obtaining this level of security is a simple matter with most desktop PCs, which, due to their size and the designer's moderate concern for package weight, are capable of locking to a cable or to a desk. However, many electronic devices, such as portable PCs, are difficult to secure because of their relatively small size and the absence of built-in features to which a lock may be attached. This makes them likely candidates for theft and other unauthorized removal.

One solution to the above problems has been the creation of a VCR-style docking station, an example of which is the "MACINTOSH DUODOCK" available from Apple Computers, Inc. This type of docking station includes a housing into which the portable PC is inserted. Once inserted, the VCR-style station performs all the connections to the peripherals and secures the portable PC in place. VCR-style docking stations work well at both providing connections between the peripherals and securing the portable PC. More importantly, because VCR-style stations secure the portable PC, they can prevent many of the problems associated with hot undocking by pre-warning the PC when an undock is about to occur. In addition, VCR-style stations also can secure the PC to prevent unauthorized users from removing the PC.

Nevertheless, VCR-style docking stations have several drawbacks. First, they are expensive, often several times more expensive than slice docking stations. Furthermore, the typical VCR-style docking station is large, sometimes larger than a desktop PC, and therefore consumes substantial desk space. Finally, VCR-style docking stations only address the foregoing problems with respect to portable PCs and are not readily adaptable for docking devices of different sizes and shapes.

Therefore, what is needed is a mechanism that is capable of locking a docking station to a PC so that the connection between the two is secure, thereby preventing unauthorized removal and accidental undocking of the PC.

SUMMARY OF THE INVENTION

The foregoing problems are solved and a technical advance is achieved by a locking mechanism which locks two electrical components together via an electromagnetic force. In the preferred embodiment, the electromagnetic locking mechanism includes an electromagnet and a ferromagnetic plate responsive to the electromagnet's electromagnetic field. The electromagnet is disposed in one of the electrical components proximate the ferromagnetic plate, thus enabling the electromagnetic locking of the two electrical components together when the electromagnet is electrically energized.

In one aspect of the invention, the electromagnet is located in a first electrical component and is connectable to a controller such that the controller regulates when the electromagnet produces the electromagnetic field. The ferromagnetic plate is disposed in a latch for mechanically latching the first and second components together located on the first electrical component proximate the electromagnet. When the electromagnet is electrically energized by the controller, the electromagnetic field produced thereby exerts an electromagnet force on the latch that prevents the latch from unlatching responsive to the exertion of ordinary force thereon.

In an alternative embodiment, the electromagnet is located in the first electrical component and the ferromagnetic plate is located in the second electrical component. The electromagnet and ferromagnetic plate are disposed on the respective components in relation to one another such that when the components are connected via mating electrical connectors, electrical energization of the electromagnet produces an electromagnetic field that exerts an attractive force on the ferromagnetic plate, thereby preventing disconnection of the components from one another through application of ordinary force.

In another embodiment of the invention, the electromagnetic locking mechanism may include a microswitch or proximity sensor and one or more retracting mechanisms, each comprising a spring, an endcap and a lanyard, for retractably connecting an electrical connector to one of the electrical components. In this manner, the electrical connector may be retractably connected to a mating connector on the other electrical component. The microswitch is disposed at interface between the two electrical components to detect separation therebetween. In this embodiment, the electromagnet produces an electromagnetic field only when the microswitch detects a separation between the two electrical components. When the microswitch detects separation, the controller runs a software program which controls when the electromagnet produces the electromagnetic field. Any separation between the two electrical components, which may be, for example, a PC and a docking station, detected by the microswitch causes the controller to electrically energize the electromagnet. The electrical energization of the electromagnet causes the first and second connectors to hold firmly together and thus to remain in electrical contact. If further separation of the components occurs, the retracting mechanism causes the PC and the docking station to hold firmly together via the lanyards, thus avoiding stress on a ribbon cable attached to one of the connectors. Springs placed over the lanyards urge the PC and docking station together even after a mechanical latch between the devices is released.

A technical advantage achieved with the invention is that it prevents accidental disconnection of two electrical components, such as, for example, a docking station and a PC.

Another technical advantage achieved with the invention is that it provides a secure connection, through use of a small, simple and inexpensive electromagnet, that easily adapts to different configurations.

Yet another technical advantage achieved with the invention is that it provides a lock that is controllable by a control program running on a processor in the PC that optionally requires the input of a code or password before allowing the PC to undock, thereby helping to prevent unauthorized removal of the PC or docking station.

Yet another technical advantage achieved with the invention is that, by allowing the processor in the PC to control when the PC undocks from the docking station, the control program can require a user to perform a warm undock instead of a hot undock, thereby helping to prevent the damage that may be caused by a hot undock.

A further technical advantage achieved with the invention is that selective electrical energization of the electromagnet only when necessary to prevent separation of the components at an inappropriate time can result in a significant power savings and prolonged battery life.

DETAILED DESCRIPTION OF THE PREFERRED EMBODIMENT

Figure 1A:
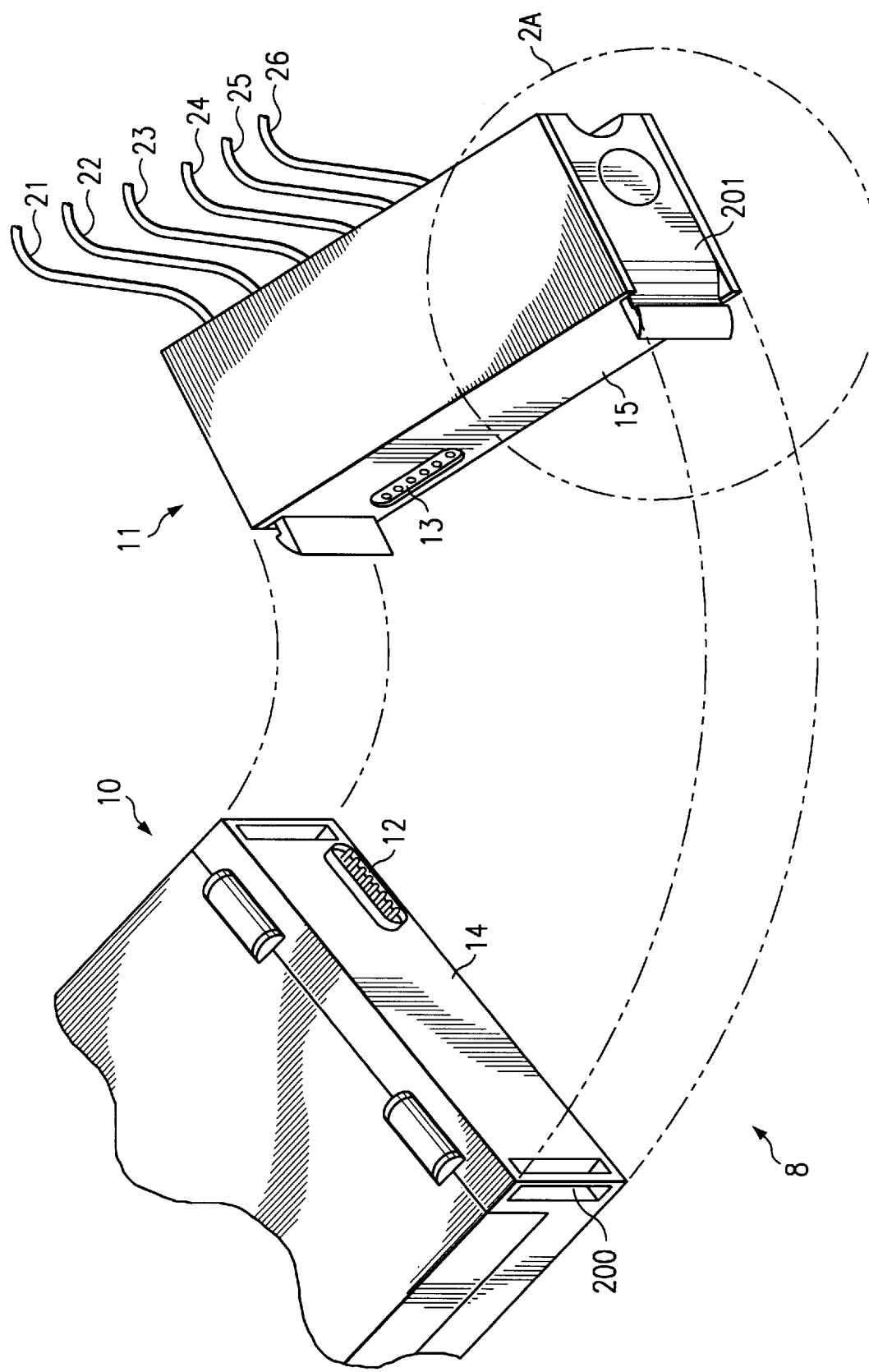
FIG. 1A is a partial perspective view of a docking system, comprising a PC and a slice, embodying features of the present invention.

FIG. 1A is a partial perspective view of an electromagnetic computer docking system 8 of the present invention, including a portable PC 10 and a slice docking station, or "slice," 11. In the preferred embodiment, the PC 10 includes a male electrical connector 12 that is electrically connectable to a female connector 13 on the slice 11 for providing electrical power from the PC 10 to the slice 11 and a housing 14 on which the connector 12 is disposed. A housing 15 of the slice 11 supports the connector 13, which, as previously indicated, is connectable to the connector 12 of the PC 10. Various peripheral devices (not shown), such as an external power supply, a monitor, a keyboard, a mouse, a hard drive and a network, may be connected to the slice 11 via lines 21, 22, 23, 24, 25 and 26, respectively. A catch 200 disposed on the housing 14 of the PC 10 operates in concert with an electromagnetic locking mechanism 201 disposed on the housing 15 of the slice 11 for latching the PC 10 to the slice, as shown and described below. Accordingly both a primarily electrical connection and a primarily mechanical connection exists between the PC 10 and slice 11 via the connectors 12, 13, and the locking mechanism 201.

Figure 1B:
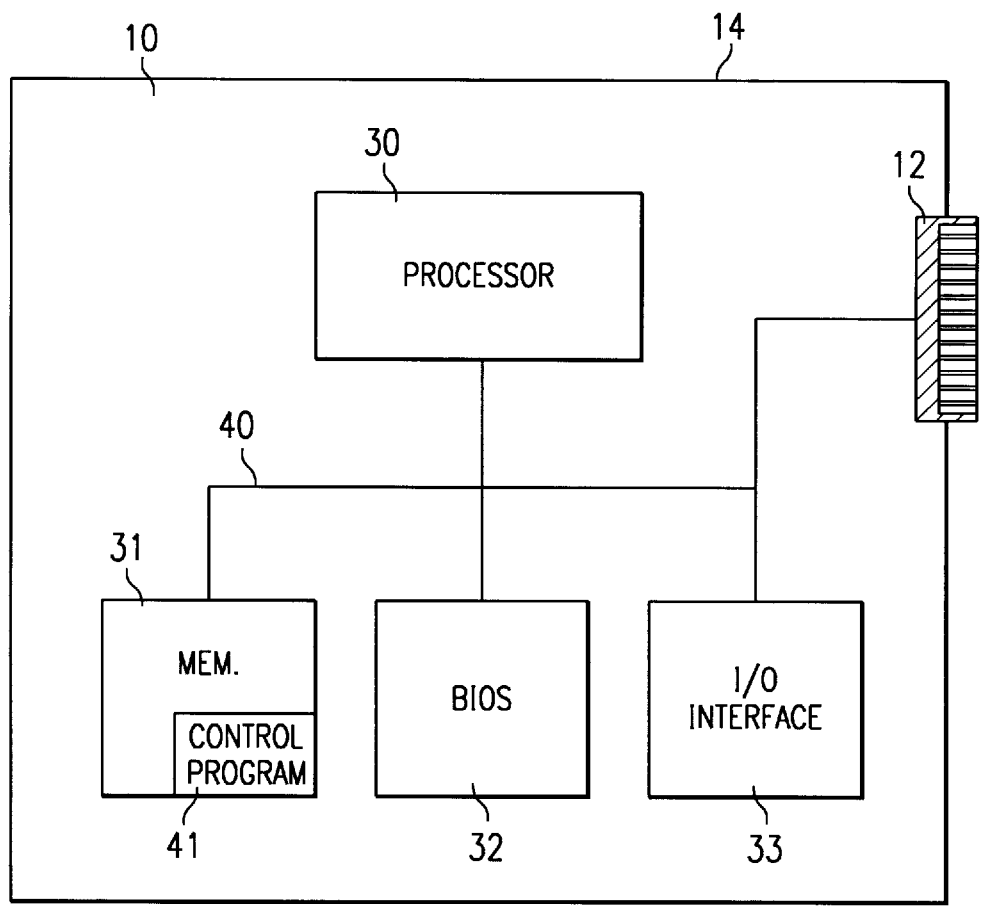
FIG. 1B is a block diagram of the PC of FIG. 1A.

FIG. 1B is a block diagram of the PC 10. The PC 10 includes a controller or processor 30, a memory 31, a BIOS 32, and an I/O interface 33 all interconnected by one or more buses 40 for enabling the PC 10 to utilize the peripherals connected via the slice 11 and to control the operation of the computer docking system 8 of the present invention. A control program 41 comprising a series of instructions for execution by the processor 30 is stored in the memory 31 or other appropriate storage device (not shown) of the PC 10. The control program 41 provides an interface between the user and the PC hardware to initiate a warm dock/undock and controls the operation of the electromagnetic locking system, as described in detail below.

In particular, the program 41 determines when a warm or hot dock/undock is permissible, controls the power to the connector 12, and appropriately electrically engages the locking mechanism. In addition, the program 41 may be configured to require a user to enter a password before the locking mechanism will electrically disengage. In this way, the computer docking system 8 serves as a security device to prevent theft or unauthorized removal of the PC 10 from the slice 11 and the peripherals attached thereto. Because the implementation and format of a suitable program for implementing the functions of the control program 41 to electrically energize the electromagnet 206 at the appropriate times will be dictated primarily by the PC's operating system and the I/O interface and apparent to those skilled in the art, the specifics of the program 41, other than the functions performed thereby, will not be described in further detail.

Figure 2A:
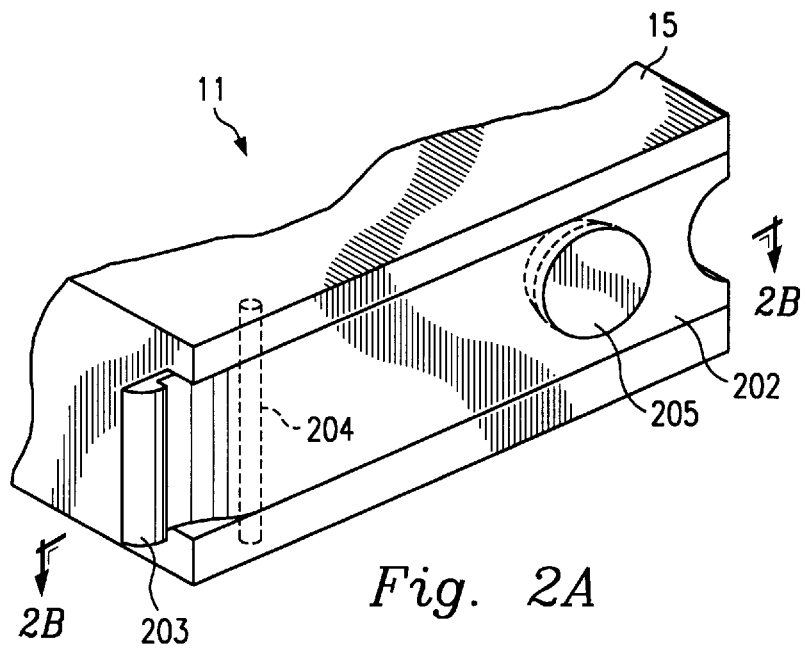
FIG. 2A is a partial perspective view of a portion of the slice of FIG. 1A indicated by a line 2A illustrating a first embodiment of the electromagnetic locking mechanism of the present invention.
Figure 2B:
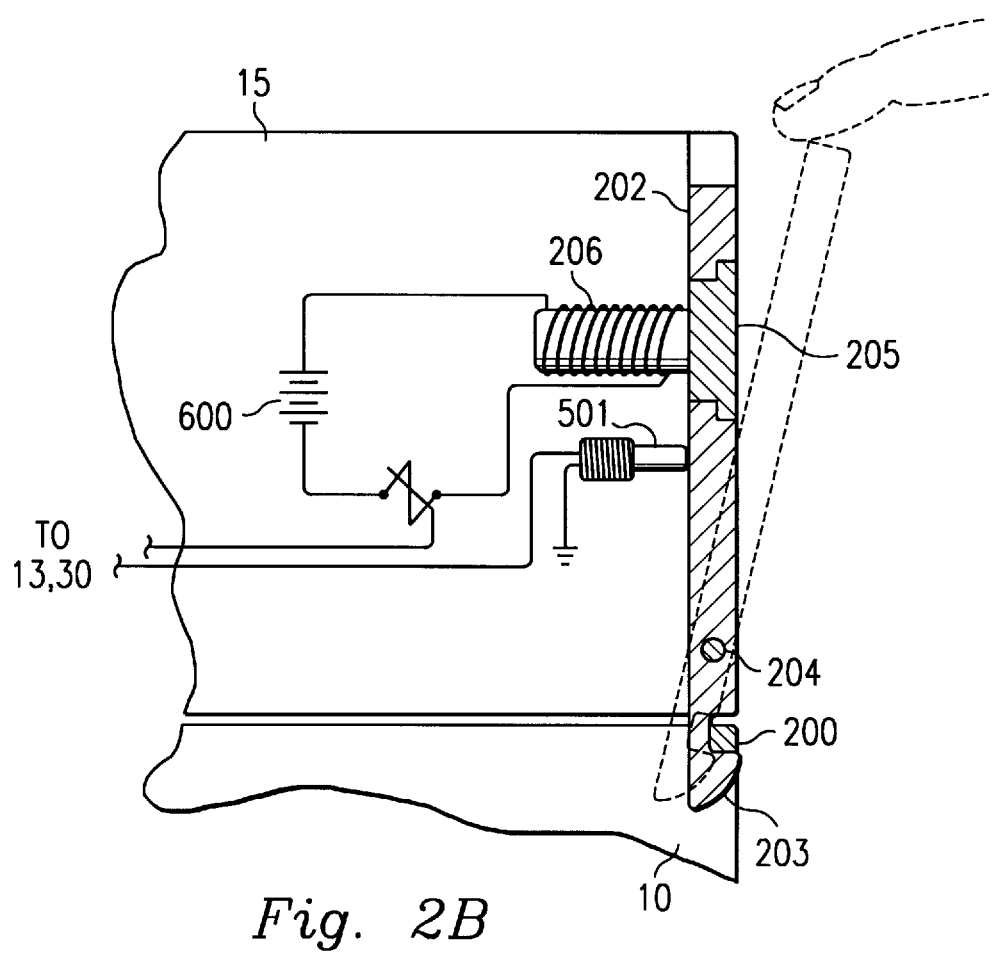
FIG. 2B is a cross-sectional view of the slice taken along line B—B of FIG. 2A.

FIGS. 2A and 2B are diagrams further depicting the preferred embodiment of an electromagnetic locking mechanism 201 of the present invention. As shown in FIG. 1A, the locking mechanism 201 attaches to the slice body 15 to secure the slice 11 to the PC 10. As shown in greater detail in FIGS. 2A and 2B, the mechanism 201 includes a handle 202, a hook 203, and a fulcrum 204. As shown in FIG. 1A, the locking mechanism 201 mechanically engages a catch 200 in the PC 10 to mechanically secure the PC in place.

Referring again to FIGS. 2A and 2B, the locking mechanism 201 further includes an electromagnet 206 located proximate the handle 202, and a ferromagnetic plate 205, which is disposed in the handle and is responsive to an electromagnetic field produced when the electromagnet 206 is electrically energized, as will be described. Power for electrically energizing the electromagnet 206 is provided by a battery 600, which provides power to the electromagnet 206 when the PC 10 is powered down and the slice 11 is not plugged into an external power source. When the electromagnet 206 mechanically engages and electrically energizes, the electromagnet attracts the plate 205, thereby attracting the handle 202 of the locking mechanism with enough force that an individual cannot open the handle with ordinary force. When the electromagnet 206 electrically disengages from its power source and is electrically de-energized, the handle 202 is released and may be opened and closed by the application of ordinary force thereon. The electromagnet 206 is electrically energized in the same manner in which electromagnets 207 (FIG. 3) and 209 (FIG. 4) are electrically energized, as described in greater detail below in connection with FIG. 4. Furthermore, the slice 11 may include additional latches, such as the latch 203, and electromagnets, such as the electromagnet 206, to better secure the slice to the PC 10.

Figure 3:
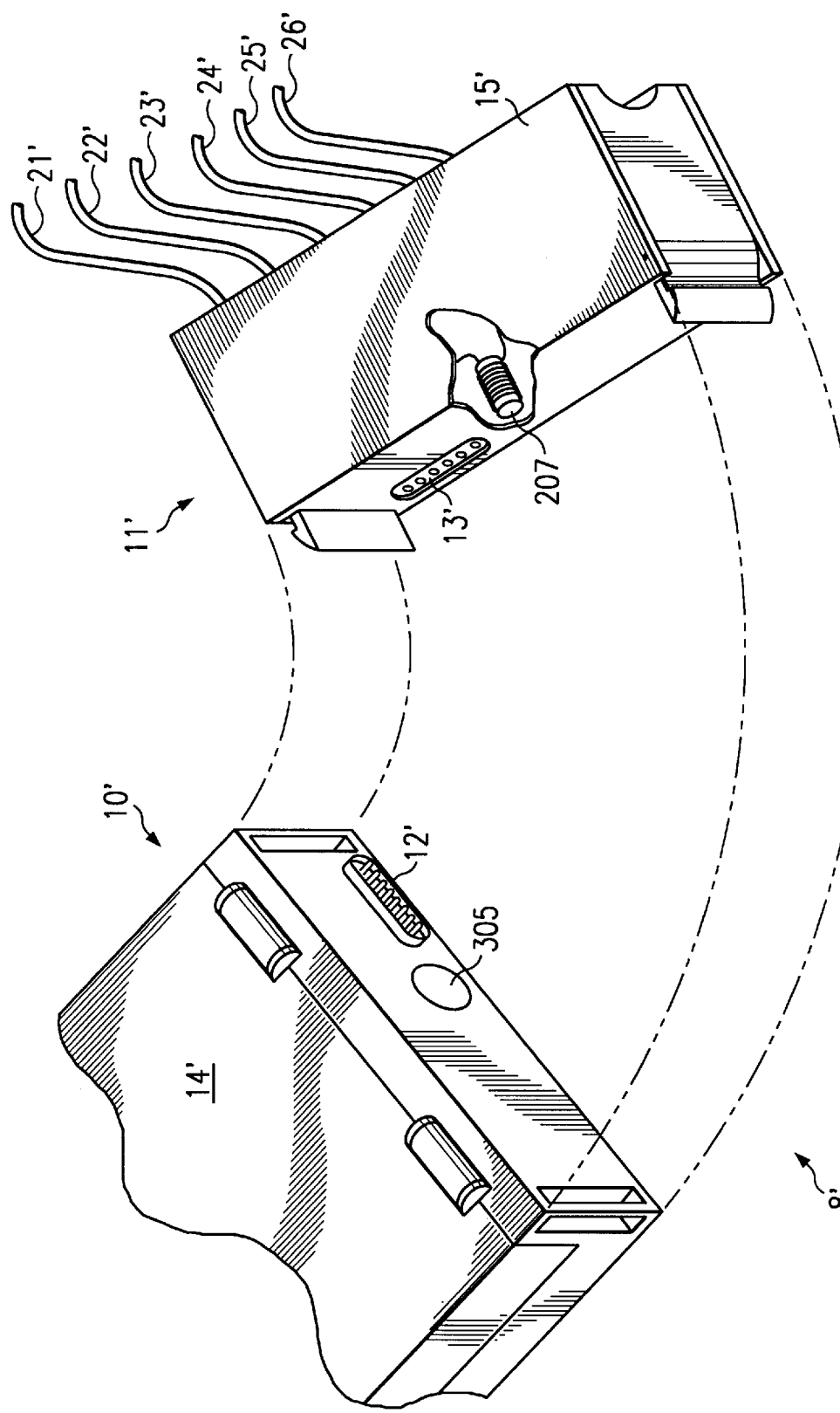
FIG. 3 is a partial perspective view of an alternative embodiment of the electromagnetic locking mechanism of the present invention.

FIG. 3 illustrates an alternative embodiment of the computer docking system 8 of FIG. 1A, designated by a reference numeral 8'. As shown in FIG. 3, similar to the embodiment shown in FIG. 1A, a PC 10', the internal configuration of which may also be represented by the block diagram shown in FIG. 1B, is connectable to a slice 11' via mating electrical connectors 12', 13', respectively disposed on a housing 14' of the PC and a housing 15' of the slice. Various peripherals (not shown) for access and use by the PC 10' are connectable to the slice 11' via line connectors 21'–26'. The PC 10' includes a ferromagnetic plate 305 located at the interface between the PC and the slice 11'. The slice 11' includes an electromagnet 207 located at the interface between the PC 10' and the slice substantially opposite the plate 305 when the PC and the slice are connected via connectors 12', 13'. Additionally, when the PC 10' is connected to the slice 11' via connectors 12', 13', the electromagnet 207 is electrically connected to the PC 10' through the connectors 12' and 13'.

As will be described, when the electromagnet 207 is mechanically engaged and electrically energized, it produces an electromagnetic field that attracts the plate 305 with enough force that a user cannot separate and disconnect the slice 11' from the PC 10' with ordinary force. When the electromagnet 207 is mechanically disengaged and electrically de-energized, the PC 10' and the slice 11' may be separated and disconnected using ordinary force. A battery (not shown) provides power to the electromagnet 207 when the PC 10' is powered down and the slice 11' in not plugged into an external power source. The electromagnet 207 is electrically energized in a manner identical to that of electromagnets 206 (FIG. 2B) and 209 (FIG. 4) as described below with reference to FIG. 4.

Figure 4:
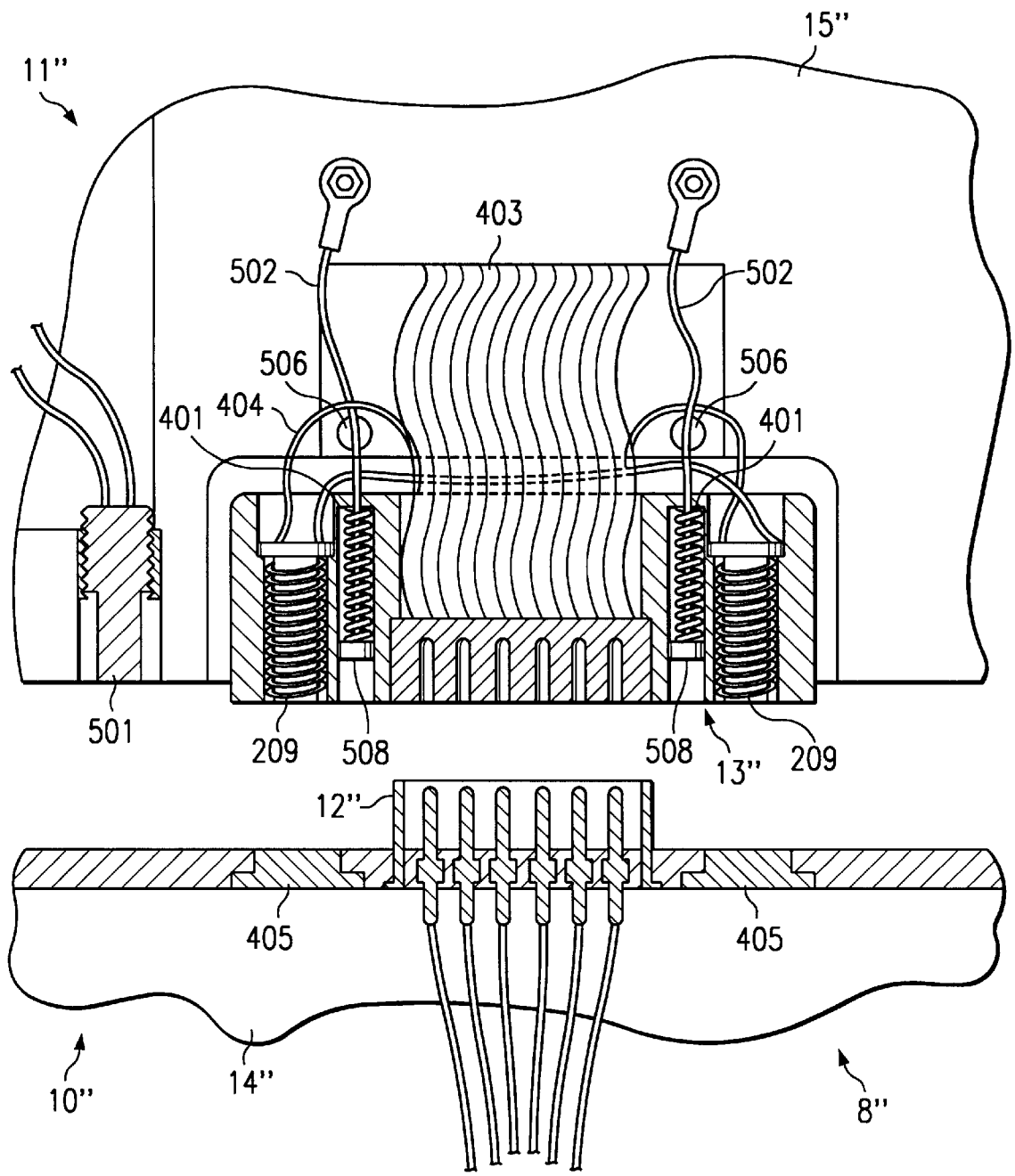
FIG. 4 is a cross-sectional view of another alternative embodiment of the electromagnetic locking mechanism of the present invention.

FIG. 4 illustrates another alternative embodiment of the computer docking system 8 of FIG. 1A, designated by a reference numeral 8". As shown in FIG. 4, similar to the embodiment shown in FIG. 1A, a PC 10", the internal configuration of which may also be represented by the block diagram shown in FIG. 1B, is connectable to a slice 11" via mating electrical connectors 12", 13", respectively disposed on a housing 14" of the PC and a housing 15" of the slice. The PC 10" also includes two ferromagnetic plates 405, which are disposed proximate the connector 12". The slice 11" includes two retracting mechanisms, each of which comprise a spring 401, an attachment lanyard 502, a stop 506, and an end cap 508, and a ribbon cable 403, which attaches the connector 13" to peripheral device interconnect lines (not shown). The retracting mechanisms retractably attach the connector 13" to the slice body 15". The slice 11" further includes two electromagnets 209, which are physically and electrically connected to the connector 13" via a conducting wire 404.

When the PC 10" and the slice 11" are connected via connectors 12", 13", each of the plates 405 is located close to one of the electromagnets 209, which are electrically connectable to a controller (not shown) of the PC 10" through the conductive wire 404, the connector 12 and the connector 13 for controlling the electrical energization of the electromagnets 209. When electromagnets 209 are mechanically engaged and electrically energized, they attract the plates 405 with enough force that the connector 12" cannot be disconnected from the connector 13" by the application of ordinary force. Because of slack in the lanyards 502, and even greater slack in the ribbon cable 403, the slice housing 15" may be separated a distance from the PC 10" equal to the slack in the lanyards 502 without disconnection of the connectors 12", 13". However, when an attempt is made to separate the slice housing 15" beyond that distance, the springs 401 begin to bias the connector 13" and the housing 15" to which it is attached back toward the PC 10". When the electromagnets 209 are electrically de-energized, the connectors 12", 13" may be disconnected, thereby disconnecting the PC 10" from the slice 11", with the application of ordinary force.

Each of the aforementioned embodiments depicted in FIGS. 2A, and 2B, 3 and 4 can be implemented in two different variations. These variations determine how and when the electromagnets 206, 207, 209 are electrically energized once the slice 11, 11', 11" and the PC 10, 10', 10" are in electrical engagement via connectors 12, 13, 12' 13', 12" 13".

In a first variation, the electromagnets 206, 207, 209 are electrically energized by the processor 30 whenever the PC 10, 10' 10" is docked to the slice 11, 11', 11" via connectors 12, 13, 12' 13', 12" 13" and power is applied to the docking system 8, 8', 8", such that the plates 205, 305, 405, are constantly attracted by the electromagnets 206, 207, 209.

FIG. 4 further depicts a second variation on each of the embodiments depicted in FIGS. 2A and 2B, 3, and 4. In this second variation, mechanical engagement and electrical energization of the electromagnets 206, 207, 209 are separately controllable events. In particular, while the connectors 12 and 13, 12' and 13', or 12" and 13", are mechanically and electrically engaged, a proximity sensor or microswitch 501 mounted to the slice housing 15, 15', 15" at the interface of the PC 10, 10', 10" and the slice 11, 11', 11", to detect separation of the two devices, at which point it sends a signal to electrically energize the electromagnets, thereby to prevent further separation of the devices, The microswitch 501 serially connects between the electromagnets 209, and the processor 30, thereby creating an 'AND' function. In this variation, electromagnets 209 electrically energize only when both the processor 30 and the microswitch 501 are electrically engaging them. Therefore, even when the processor 30 is electrically engaging the electromagnets 209, electromagnets will not electrically energize until separation begins. When the PC 10, 10', 10" and the slice 11, 11', 11" are reconnected, as detected by the microswitch 501, the electromagnets 206, 207, 209 are electrically de-energized. Alternatively, if the processor 30 is not electrically engaging the electromagnets 209, the slice 11 and the PC 10 are freely separable.

Although illustrative embodiments of the invention have been shown and described, a wide range of modification, change and substitution is intended in the foregoing disclosure, and in some instances some features of the present invention may be employed without a corresponding use of the other features. For example, although this invention has been described in conjunction with its function of connecting docking units to portable PCs, it would be obvious to utilize this invention to secure other electrical components, such as a CD ROM drive and a desktop PC, to one another. Accordingly, it is appropriate that the appended claims be construed broadly and in a manner consistent with the scope of the invention.

What is claimed is:

1. A system for securing a first electrical component to a second electrical component comprising:

a locking mechanism including an electromagnet capable of selectively producing an electromagnetic field, and means attracted to the electromagnet in response to the electromagnetic field;

wherein the electromagnet is disposed in the second electrical component and the means attracted to the electromagnet is disposed in the first electrical component and, wherein, responsive to the production of the electromagnetic field by the electromagnet, the means attracted to the electromagnet is biased toward the electromagnet to secure the first electrical component to the second electrical component; and means located at an interface between the first and second electrical components for detecting a separation of the first and second electrical components, wherein the electromagnet is caused to produce the electromagnetic field only when the separation is detected.

2. The system of claim 1 further comprising a controller electrically connected to the electromagnet for controlling when the electromagnet produces the electromagnetic field.

3. The system of claim 1, wherein an electromagnetic force is created by the electromagnetic field and the means attracted to the electromagnet by the electromagnetic force is a ferromagnetic plate.

4. The system of claim 1 further comprising a controller electrically connected to the electromagnet for controlling when the electromagnet produces the electromagnetic field and a control program executable by the controller for controlling production of the electromagnetic field by the electromagnet.

5. An apparatus for securing a docking station to a computer, the apparatus comprising:

an electromagnet capable of selectively producing an electromagnetic field; and means attracted to the electromagnet in response to the electromagnetic field;

wherein each of the electromagnet and the means attracted to the electromagnet are disposed in at least one of the docking station and the computer and, wherein, responsive to the production of the electromagnetic field by the electromagnet, the means attracted to the electromagnet is biased toward the electromagnet to secure the docking station to the computer.

6. The apparatus of claim 5 wherein the means attracted to the electromagnet comprises a latching mechanism, said latching mechanism being biased toward the electromagnet in response to the electromagnetic field in order to prevent the latching mechanism from being unlatched by application of ordinary force thereon.

7. The apparatus of claim 5 further comprising means for electrically connecting the electromagnet to a controller of the computer when the docking station is secured to the computer for controlling the production of the electromagnetic field by the electromagnet.

8. The apparatus of claim 5 wherein the means attracted to the electromagnet is located in the computer and the electromagnet is located in the docking station.

9. The apparatus of claim 8 further comprising a first electrical connector located on the computer and a second electrical connector for connecting to the first electrical connector located on the docking station, such that whenever the computer is physically secured to the docking station via the first and second electrical connectors, the computer is in electrical connection with the docking station.

10. The apparatus of claim 9 wherein the production of the electromagnetic field by the electromagnet is controlled by a controller of the computer via the electrical connection between the computer and the docking station.

11. The apparatus of claim 5 wherein the means attracted to the electromagnet is located in the docking station and the electromagnet is located in the computer.

12. The apparatus of claim 11 wherein production of the electromagnetic field by the electromagnet is controlled by a controller of the computer.

13. The apparatus of claim 5 wherein the electromagnet is connected to a first electrical connector disposed on the computer and the means attracted to the electromagnet is connected to a second electrical connector disposed on the docking station, the first and second electrical connectors being matingly connectable to one another, such that when the electromagnet is producing the electromagnet field, the means attracted to the electromagnet is biased toward the electromagnet, thereby biasing the second connector toward the first connector and maintaining electrical contact between the two connectors.

14. The apparatus of claim 13 further comprising means for retractably connecting the second electrical connector to the docking station, such that once the docking station is secured to the computer via the first and second electrical connectors, and, so long as the electromagnet is producing the electromagnetic field, the computer and the docking station may be separated up to a given distance from one another without electrical contact therebetween being disrupted.

15. The apparatus of claim 5 further comprising a control program executable by a controller of the computer for controlling production of the electromagnetic field by the electromagnet.

16. A locking mechanism for securing two computer electrical components together, the locking mechanism comprising:

an electromagnet capable of producing an electromagnetic field;

means attracted to the electromagnet in response to the electromagnetic field; and a pair of engaged connectors, a first one of the connectors being mounted on a first one of the components and a second one of the connectors being mounted on a second one of the components;

wherein each of the electromagnet and the means attracted to the electromagnet are disposed in at least one of the components and, wherein, responsive to the production of the electromagnetic field by the electromagnet, the means attracted to the electromagnet is biased toward the electromagnet to secure the first component to the second component and resist disengagement of the connectors.

17. The locking mechanism of claim 16, wherein the electromagnet is electrically connected to a controller for regulating when the electromagnet produces the electromagnetic field.

18. The locking mechanism of claim 16, wherein the means attracted to the electromagnet comprises a latching mechanism, the electromagnetic field creating an electromagnetic force between the electromagnet and the latching mechanism to prevent unlatching of the latching mechanism when ordinary force is applied thereon.

19. The locking mechanism of claim 16, wherein the means attracted to the electromagnet is located in the first electrical component and the electromagnet is located in the second electrical component.

20. The locking mechanism of claim 19 wherein, when an electromagnetic force is created by the electromagnetic field, the electromagnetic force causes the second electrical connector on the second electrical component to attract a ferromagnetic plate located proximate the first electrical connector on the first electrical component.

21. The locking mechanism of claim 16, further comprising retracting means for connecting the second connector to the second electrical component, whereby when the second electrical component is separated from the first electrical component upon the application of ordinary force, the first connector and a second connector of the second component remain secured and the retracting means biases the first and second components together.

22. A method for securing together a first and a second electrical component comprising:

providing the first electrical component with a first electrical connector;

providing the second electrical component with a mating second electrical connector;

providing, in one of the first and second electrical components, an electromagnet for producing an electromagnetic field when electrically energized;

providing a ferromagnetic plate in the other of the first and second electrical components;

connecting the first and second electrical connectors together, thereby creating an electrical connection between the first and second electrical components;

wherein the electromagnet and the ferromagnetic plate are disposed relative to the first and second connectors such that production of an electromagnetic field by the electromagnet biases the electrical connectors together such that they cannot be separated responsive to the application of ordinary force.

23. The method of claim 22 further comprising:

providing means for extending the first electrical connector from the first electrical component a given distance while biasing the first electrical connector toward the first electrical component such that the first and second electrical components may be separated from one another a given distance without disconnecting the first and second electrical connectors.

24. The method of claim 22 further comprising:

detecting a physical separation of the first and second electrical components; and electrically energizing the electromagnet in response to the detection of a physical separation of the first and second electrical components.

25. A system for securing a first electrical component to a second electrical component, comprising:

a first electrical connector disposed in the first electrical component;

a second electrical connector disposed in the second electrical component for mating with the first electrical connector to electrically connect the first and second electrical components;

a locking mechanism comprising an electromagnet positioned in the first component capable of selectively producing an electromagnetic field, and means positioned in the second component attracted to the electromagnet in response to the electromagnetic field;

wherein an electromagnetic force created by the electromagnetic field causes the first electrical connector of the first component to attract a ferromagnetic plate of the second component, the locking mechanism further comprising retracting means for connecting the first connector to the first electrical component, whereby, when the first electrical component is separated from the second electrical component upon the application of ordinary force, the first connector and a second connector of the second component remain secured and the retracting means biases the first and second components together.

26. A computer docking system, comprising:

a first electrical component;

a second electrical component;

wherein at least one of said electrical components includes a locking mechanism, the locking mechanism comprising an electromagnetic capable of selectively producing an electromagnetic field, and means attracted to the electromagnet in response to the electromagnetic field; and means located at an interface between the first and second electrical components for detecting a separation of the first and second electrical components, wherein the electromagnet is caused to produce the electromagnetic field only when the separation is detected.

27. A method for securing a first and a second electrical component together, the method comprising:

providing at least one of the electrical components with at least one electromagnet for producing an electromagnetic field when electrically energized;

providing at least one of the electrical components with at least one ferromagnetic plate;

electrically energizing the at least one of the electromagnets when the electrical components are in electrical contact with one another; and providing means for extending a first electrical connector from the first electrical component a given distance while biasing the first electrical connector toward the first electrical component such that the first and second electrical components may be separated from one another a given distance without disconnecting the first and a second electrical connector, wherein the at least one ferromagnetic plate is disposed such that electrical energization of the at least one electromagnet causes the at least one ferromagnetic plate to be attracted to the at least one electromagnet in a manner that secures the components together.

28. The method of claim 27 further comprising:

detecting a physical separation of the first and second electrical components; and electrically energizing the at least one electromagnet in response to the detection of a physical separation of the first and second electrical components.

29. A locking mechanism for securing two computer electrical components together, each component including a connector for electrically connecting the components, the locking mechanism comprising:

an electromagnet disposed in one of the electrical components, the electromagnet being capable of selectively producing an electromagnetic field; and a latching mechanism for mechanically securing the first electrical component to the second electrical component when they are electrically connected, wherein the latching mechanism is responsive to an electromagnetic force created by the selectively produced electromagnetic field such that the electromagnetic force resists disengagement of the electrical connection.

30. The system of claim 29 further comprising means located at an interface between the first and second electrical components for detecting a separation of the first and second electrical components, wherein the electromagnet is caused to produce the electromagnetic field only when the separation is detected.

31. The system of claim 29 further comprising a controller electrically connected to the electromagnet for controlling when the electromagnet produces the electromagnetic field.

32. The system of claim 29 further comprising a controller electrically connected to the electromagnet for controlling when the electromagnet produces the electromagnetic field and a control program executable by the controller for controlling production of the electromagnetic field by the electromagnet.

33. The system of claim 29, wherein an electromagnetic force is created by the electromagnetic field and the means attracted to the electromagnet by the electromagnetic force is a ferromagnetic plate.

34. A system for securing a first electrical component having a first electrical connector to a second electrical component having a mating electrical connector, the system comprising:

a locking mechanism including an electromagnetic capable of selectively producing an electromagnetic field, and means attracted to the electromagnet in response to the electromagnetic field; and means located at an interface between the first and second electrical components for detecting a separation of the first and second electrical components, wherein the electromagnet is caused to produce the electromagnetic field only when the separation is detected.

35. The system of claim 34, wherein an electromagnetic force is created by the electromagnetic field and the means attracted to the electromagnet by the electromagnetic force is a ferromagnetic plate.

* * * * *